Aug. 9, 1927.
A. H. LINDE
1,638,537
CAGE FOR BALL BEARINGS
Original Filed Jan. 20, 1926   2 Sheets-Sheet 1
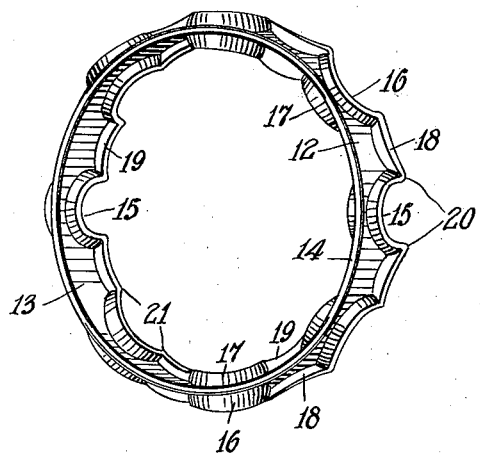
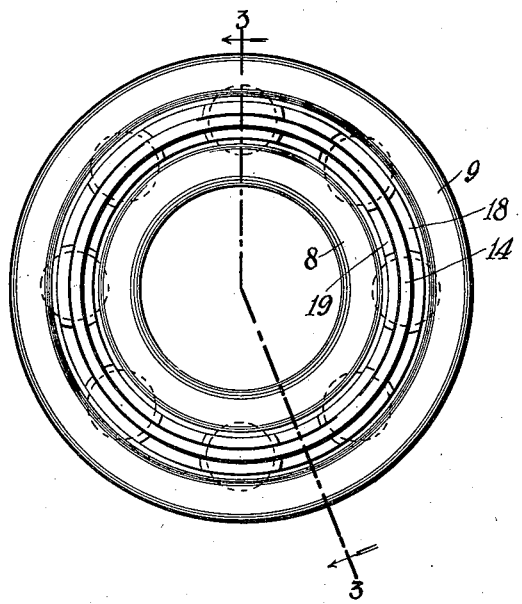
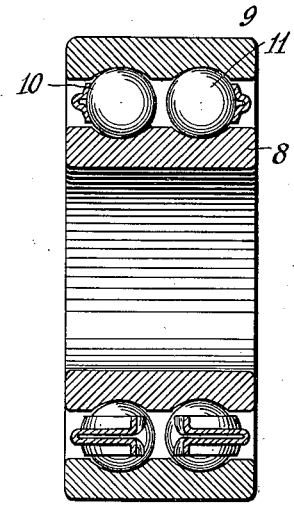
INVENTOR
Andrew H. Linde
BY
ATTORNEY Aug. 9, 1927.
A. H. LINDE
1,638,537
CAGE FOR BALL BEARINGS
Original Filed Jan. 20, 1926    2 Sheets-Sheet 2
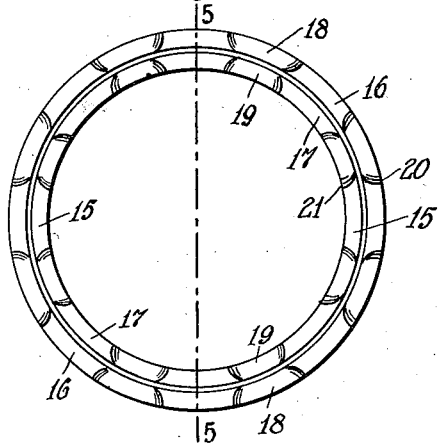
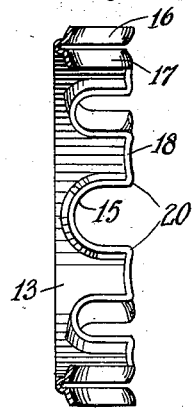
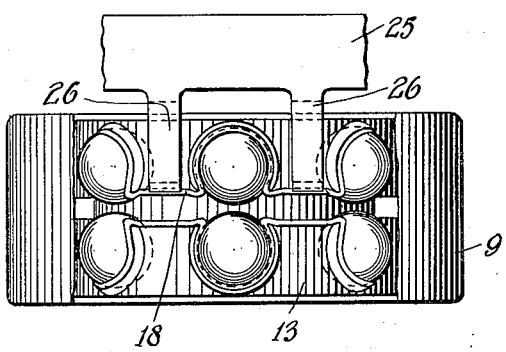
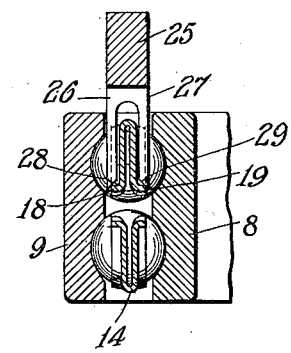
INVENTOR
Andrew H. Linde
BY
ATTORNEY Patented Aug. 9, 1927.

1,638,537

UNITED STATES PATENT OFFICE.

ANDREW H. LINDE, OF PHILADELPHIA, PENNSYLVANIA, ASSIGNOR TO THE HESS-BRIGHT MANUFACTURING COMPANY, OF PHILADELPHIA, PENNSYLVANIA, A CORPORATION OF DELAWARE.

CAGE FOR BALL BEARINGS.

Application filed January 20, 1926, Serial No. 82,568. Renewed December 4, 1926.

The subject of this invention is specially designed for use in bearings wherein the ball separator or spacer is placed between the balls after these are assembled between the rings in proper spaced position in the race grooves. It is peculiarly useful in the assembly of the two row deep groove radial type of bearing.

The preferred embodiment of the invention is drawn from sheet metal and presents two concentric substantial cylindrical rings or plates disposed face to face and connected at one edge, making a structure substantially U-shaped in cross section, although rather flattened. In the edges at the open side of the structure there are formed open notches for ball pockets. During the forming operation the metal surrounding the notches and the free edges of the plates between the notches is extruded in the form of flanges. The extrusion of metal from the outer plate is preferably projected outwardly and that from the inner plate projected inwardly. This is the most convenient method, particularly when the plates are pressed rather closely together. The flange carried by each plate is preferably continuous. That portion of the flange between the pockets, especially when given an inward bend, tends to stiffen the corner.

In the drawings accompanying this specification one practicable embodiment of the invention is illustrated, in which drawings, Figure 1 shows in perspective a cage or separator formed in accordance with my invention, the view being taken from the closed side; this side being the one seen from the outside of the bearing when the separator is in its assembled position.

Fig. 2 is an elevation of a bearing equipped with the improved separator.

Fig. 3 is a section of the bearing shown in Fig. 2 at about the plane of the line 3—3.

Fig. 4 is an elevation of the separator viewed from the open side.

Fig. 5 is a central sectional view of the retainer taken at about the plane of the line 5—5 Fig. 4 and Figs. 6 and 7 are details showing the manner in which the separator may be tightly closed upon the balls in some instances.

When the cage is assembled in a two row bearing, the rows, 10—11 of balls are placed in position between the rings, 8 and 9, and spaced, and the cage for each row is presented from the outside with the connected edges of the plates, 12 and 13, directed outwardly, the structure then being sprung or snapped into position about the balls.

The bearing rings 8 and 9 shown by way of illustration herein are of the deep groove unnotched type, which are intended to be assembled with the two sets of balls, 10 and 11, by the Conrad or eccentric method. In this method of assembly as is well known the balls are placed between the rings in proper spaced position in the race grooves prior to the application of the cage or spacing device. The cage or spacer is then applied and secured in position. According to the present invention the cage for each row of balls is formed of a single piece of sheet metal which upon being applied to the balls from the outside snaps into position and holds itself in place, and if desired, may be tightened by the application of suitable instruments. In a two row bearing of this type it is quite obvious that with the two rows of balls as closely related as they are in the showing in Fig. 3, which by the way, is substantially in proportion to the S. A. E. standard dimensions for wide series bearings, the separators must of necessity be applied from the outside and the structure must be such that the upsetting or deforming instrument, when one is used, can enter the space between the rings and pass through the narrowest space between the two adjacent balls before reaching its work.

In the illustration the separator is shown drawn from a single piece of sheet metal and forms two substantially cylindrical rings or plates, 12 and 13, united at one edge by a fold, 14. This fold, 14, is really the bottom or connecting member made by the drawing dies. During the drawing operation a series of notches for affording ball pockets, 15, are formed in the free edges of the plates. The metal during the operation of forming these pockets is extruded into a flange directed away from the respective plates. When these plates are formed quite close together, as they are shown in Figs. 4 and 5, the extruded metal is directed toward the outer faces of the plates. Or in other words, the flange, 16, from the outer plate is directed outwardly and the flange, 17, from the inner plate is directed inwardly. The flange upon each plate is shown as extended entirely around each ball pocket, 15 and continuing between pockets—see 18 Fig. 5. The depth of each pocket is preferably somewhat greater than half the diameter of the ball intended to be seated therein.

The curvature of the inner faces of the pocket forming flanges, 16 and 17, is such that they extend above and below the great circle of the ball so that the cage will not permit a ball to either unduly depress or raise the cage, that is, the ball cannot ride over or under the cage.

The portions, 18 and 19, of the flanges extending between the ball pockets are formed into a concave shape which assists in adding strength to the flange. The corners, 20 and 21, of the flanges at the merging of the pocket flanges and the connecting flanges are shown forming an acute angle and overlapping the balls.

After the balls have been assembled between the rings, the cage may be applied by bringing it into such a position that the corners at the entrance of the various pockets engage the balls, whereupon a slight inward pressure springs the plates apart sufficiently to permit the entrance of the balls into the pockets. After the balls enter the pockets and pass the corners, 20 and 21, the parts assume their normal position.

In some cases it may be found desirable to have the plates normally open or apart at the free edges, either sufficient to permit the structure to pass the balls without any bending or with slight bending and subsequently to close the plates together. The method of doing this is indicated in Figs. 6 and 7 wherein a ring, 25, is illustrated having a series of punches or fingers, 26—27 adapted to enter the space between the ball pockets and to straddle the plates. The ends of the fingers are shown beveled, at 28—29, for engaging the flanges 18—19 and pressing the plates together by a wedging action, the pressure being sufficient to deform and give a permanent set to the structure so that upon the withdrawal of the instrument the parts remain in position.

Having described my invention I claim and desire to secure by Letters Patent:

1. A spacing cage for ball bearings consisting of a folded body portion presenting two plates disposed face to face and provided at intervals in their edges with open notches, and having flanges extending outwardly from the notches laterally beyond the outer faces of the plates and constituting conjointly ball holding sockets, the flange upon each plate being continuous and extending along the edge of such plate between sockets.

2. A spacing cage for ball bearings consisting of a folded body portion presenting two plates disposed face to face and provided at intervals in their edges with open notches, and having flanges extending outwardly from the notches laterally beyond the outer faces of the plates and constituting conjointly ball holding sockets, the flange upon each plate being continuous and extending along the edge of such plate between sockets, the edges of the plates being normally spread apart before assembly in a bearing to facilitate the introduction of balls into the sockets.

3. A spacing cage for ball bearings consisting of a folded body portion presenting two plates disposed face to face and provided at intervals in their edges with open notches, and having flanges extending outwardly from the notches laterally beyond the outer faces of the plates and constituting conjointly ball holding sockets, the flange upon each plate being continuous and extending along the edge of such plate between sockets, the portions of the flange between sockets being concave, whereby acute angles are formed with the corners of pocket flanges.

4. A spacing cage for ball bearings consisting of a folded body portion presenting two plates disposed face to face and provided at intervals in their edges with open notches, and having flanges extending outwardly from the notches laterally beyond the outer faces of the plates and constituting conjointly ball holding sockets, the flanges upon the plates being continuous and extending between sockets, the flanges between sockets being concave.

5. A spacing cage for ball bearings consisting of a folded body portion presenting two plates disposed face to face and provided at intervals in their edges with open notches, constituting conjointly ball holding sockets, one of said plates having a flange extending outwardly from the notches laterally beyond its outer face, such flange extending between sockets.

6. A spacing cage for ball bearings consisting of a folded body portion presenting two plates disposed face to face and provided at intervals in their edges with open notches, constituting conjointly ball holding sockets, one of said plates having a flange extending outwardly from the notches laterally beyond its outer face, such flange extending continuously between sockets.

7. A spacing cage for ball bearings consisting of a folded body portion presenting two plates disposed face to face and provided at intervals in their edges with open notches, constituting conjointly ball holding sockets, one of said plates having a flange extending outwardly from the notches laterally beyond its outer face, such flange extending between sockets, and such flange between sockets being concave.

Signed at the city of Philadelphia, Pa. this 18th day of January, 1926.

ANDREW H. LINDE.